United States Patent
Bauza et al.

(10) Patent No.: US 10,220,566 B2
(45) Date of Patent: Mar. 5, 2019

(54) METHOD AND ARRANGEMENT FOR PRODUCING A WORKPIECE BY USING ADDITIVE MANUFACTURING TECHNIQUES

(71) Applicants: Carl Zeiss Industrielle Messtechnik GmbH, Oberkochen (DE); Carl Zeiss Industrial Metrology, LLC, Maple Grove, MN (US)

(72) Inventors: Marcin B. Bauza, Plymouth, MN (US); Richard H. Knebel, Brighton, MI (US); Thomas Engel, Aalen (DE); Nils Haverkamp, Aalen (DE); Rainer Sagemueller, Aalen (DE); Dominik Seitz, Schwaebisch Gmuend (DE); Tobias Held, Noerdlingen (DE)

(73) Assignees: Carl Zeiss Industrielle Messtechnik GmbH, Oberkochen (DE); Carl Zeiss Industrial Metrology, LLC, Maple Grove, MN (US)

( * ) Notice: Subject to any disclaimer, the term of this patent is extended or adjusted under 35 U.S.C. 154(b) by 300 days.

(21) Appl. No.: 14/248,610

(22) Filed: Apr. 9, 2014

(65) Prior Publication Data

US 2015/0061170 A1    Mar. 5, 2015

(30) Foreign Application Priority Data

Sep. 2, 2013 (DE) .......................... 10 2013 217 422

(51) Int. Cl.
*B29C 67/00* (2017.01)
*B29C 64/153* (2017.01)
(Continued)

(52) U.S. Cl.
CPC .......... *B29C 64/153* (2017.08); *B29C 64/386* (2017.08); *B33Y 10/00* (2014.12); *B33Y 50/02* (2014.12)

(58) Field of Classification Search
CPC ..... B29C 67/0088; B29C 64/10; B29C 64/20; B29C 64/30; B29C 64/40; B33Y 10/00; B33Y 3/00; B33Y 40/00; B33Y 50/00
See application file for complete search history.

(56) References Cited

U.S. PATENT DOCUMENTS 5,352,310 A * 10/1994 Natter ................. B32B 38/0008
156/155
6,309,809 B1    10/2001 Starikov et al.
(Continued)

FOREIGN PATENT DOCUMENTS

DE           103 14 461 A1    11/2003
DE    10 2008 016 026 A1    10/2009
(Continued)

OTHER PUBLICATIONS

German language Examination Report; dated Apr. 14, 2014; 6 pp.

*Primary Examiner* — Nahida Sultana
(74) *Attorney, Agent, or Firm* — Harness, Dickey & Pierce, P.L.C.

(57) ABSTRACT

A method and an arrangement for producing a workpiece using additive manufacturing techniques involve in-process measurement in order to determine individual characteristics of one or more workpiece layers. In particular, dimensional and/or geometrical characteristics of a workpiece layer are measured before the next workpiece layer is produced. Advantageously, the measurement results are fed back into the production process in order to increase accuracy and precision of the production process.

19 Claims, 3 Drawing Sheets

(51) Int. Cl.
*B33Y 10/00* (2015.01)
*B33Y 50/02* (2015.01)
*B29C 64/386* (2017.01)

(56) References Cited

U.S. PATENT DOCUMENTS

| | | | | |
|---|---|---|---|---|
| 6,483,596 | B1* | 11/2002 | Philippi | B29C 67/0088 156/272.8 |
| 6,930,278 | B1* | 8/2005 | Chung | B23K 26/34 219/121.83 |
| 7,043,330 | B2* | 5/2006 | Toyserkani | B23K 26/032 219/121.6 |
| 7,625,198 | B2 | 12/2009 | Lipson et al. | |
| 7,628,198 | B2* | 12/2009 | Ouyang | F28F 13/16 165/80.3 |
| 7,939,003 | B2 | 5/2011 | Bonassar et al. | |
| 8,226,395 | B2* | 7/2012 | Pax | B29C 67/0055 425/174.4 |
| 8,414,280 | B2* | 4/2013 | Pettis | G06F 3/12 264/308 |
| 8,636,938 | B2 | 1/2014 | Bonassar et al. | |
| 8,666,142 | B2* | 3/2014 | Shkolnik | B29C 67/0088 382/154 |
| 8,778,252 | B2* | 7/2014 | Mackie | B29C 67/0055 264/308 |
| 8,804,102 | B2* | 8/2014 | Green | B23K 26/0066 356/28 |
| 8,877,112 | B2 | 11/2014 | Bonassar et al. | |
| 9,205,690 | B2* | 12/2015 | Leavitt | B29C 67/0055 |
| 9,242,031 | B2 | 1/2016 | Bonassar et al. | |
| 9,364,995 | B2* | 6/2016 | Roberts, IV | B29C 67/0088 |
| 9,527,272 | B2* | 12/2016 | Steele | B29C 67/0055 |
| 9,723,866 | B2 | 8/2017 | Lipson et al. | |
| 2002/0149137 | A1* | 10/2002 | Jang | G03F 7/0037 264/494 |
| 2002/0195747 | A1* | 12/2002 | Hull | B29C 64/124 264/401 |
| 2003/0205849 | A1* | 11/2003 | Farnworth | B33Y 10/00 264/401 |
| 2004/0251581 | A1* | 12/2004 | Jang | B22F 3/008 264/497 |
| 2005/0248065 | A1* | 11/2005 | Owada | B29C 67/0055 264/494 |
| 2005/0280185 | A1* | 12/2005 | Russell | B28B 1/001 264/308 |
| 2007/0228592 | A1 | 10/2007 | Dunn et al. | |
| 2009/0024243 | A1* | 1/2009 | Suh | B23K 26/032 700/119 |
| 2009/0248355 | A1 | 10/2009 | Kriegmair | |
| 2010/0125356 | A1* | 5/2010 | Shkolnik | B29C 67/0088 700/98 |
| 2011/0061591 | A1 | 3/2011 | Stecker | |
| 2011/0130854 | A1 | 6/2011 | Lettenbauer et al. | |
| 2013/0015596 | A1 | 1/2013 | Mozeika et al. | |
| 2013/0078821 | A1* | 3/2013 | Furutono | G03F 7/0002 438/780 |
| 2013/0178952 | A1* | 7/2013 | Wersborg | B23K 1/0056 700/47 |
| 2013/0189435 | A1* | 7/2013 | Mackie | B29C 67/0055 427/256 |
| 2014/0107823 | A1* | 4/2014 | Huang | B29C 67/0059 700/98 |
| 2014/0271961 | A1* | 9/2014 | Khoshnevis | C04B 35/622 425/78 |
| 2015/0045928 | A1* | 2/2015 | Perez | B29C 67/0088 700/110 |
| 2015/0140147 | A1* | 5/2015 | Konstantinos | B33Y 30/00 425/131.1 |
| 2015/0165681 | A1* | 6/2015 | Fish | B22F 3/1055 264/40.6 |
| 2015/0174828 | A1* | 6/2015 | Creuzer | B29C 67/0059 264/40.1 |
| 2015/0352872 | A1* | 12/2015 | Conrow | B41J 29/393 347/14 |
| 2016/0095959 | A1 | 4/2016 | Bonassar et al. | |
| 2016/0193790 | A1* | 7/2016 | Shuck | B29C 67/0088 700/119 |
| 2016/0339643 | A1* | 11/2016 | Dikovsky | B41M 5/0082 |
| 2017/0133252 | A1* | 5/2017 | Fung | H01L 21/67294 |
| 2017/0234676 | A1* | 8/2017 | Haverkamp | G01B 5/008 33/503 |
| 2017/0241769 | A1* | 8/2017 | Seitz | G02B 19/0066 |
| 2017/0274599 | A1* | 9/2017 | Kitamura | B33Y 10/00 |
| 2017/0316568 | A1* | 11/2017 | Seitz | G06T 7/13 |
| 2018/0018778 | A1* | 1/2018 | Haverkamp | G01B 5/008 |
| 2018/0035011 | A1* | 2/2018 | Share | G06F 21/31 |
| 2018/0050493 | A1* | 2/2018 | Sanz Ananos | B33Y 50/00 |
| 2018/0066933 | A1* | 3/2018 | Seitz | G01B 11/005 |
| 2018/0096485 | A1* | 4/2018 | Held | G06T 7/246 |

FOREIGN PATENT DOCUMENTS

DE 10 2008 034 117 A1 2/2010
EP 2 313 867 B1 4/2011

* cited by examiner

METHOD AND ARRANGEMENT FOR PRODUCING A WORKPIECE BY USING ADDITIVE MANUFACTURING TECHNIQUES

CROSS-REFERENCES TO RELATED APPLICATIONS

This application claims convention priority from German patent application 10 2013 217 422.5 filed on Sep. 2, 2013 with the German Patent and Trademark Office. The entire content of this priority application is incorporated herein by reference.

BACKGROUND OF THE INVENTION

The present invention relates to a method and an arrangement for producing a workpiece by using additive manufacturing techniques. More particularly, the invention relates to a method and an arrangement for producing a workpiece by applying defined material layers step by step and one on top of the other.

Traditional manufacturing techniques are often based on removing material from a block of material by cutting, milling, drilling, grinding or other abrasive processes. These traditional manufacturing methods may be called subtractive manufacturing, because removal of the material is the core production step in the process.

The traditional subtractive manufacturing techniques offer a variety of capabilities which can nowadays be carried out at a high level of precision. The range of shapes that can be produced, however, is limited by the access of the abrasive tools to designed features. Other production techniques involve injection molding, casting and similar processes that use a mold where a workpiece is formed. These production processes can be very cost-efficient for high volume products, but they are often too expensive if only a small number of parts is required. In addition, the range of shapes that can be produced is again limited due to restrictions of the mold.

Therefore, additive manufacturing techniques have gained increasing interest not only for the manufacture of prototypes, but also as a promising new manufacturing technology in general. A variety of additive manufacturing techniques have been proposed including but not limited to Selective Laser Sintering, Selective Laser Melting, Fused Deposition Modeling and Stereolithography. These methods typically use heat or other sources of energy in order to selectively bind material particles thereby forming a material layer of the workpiece. After the production process, the workpiece is cooled down or will automatically cool down to ambient temperature. The temperature variations may lead to internal stress, tensions, warping caused thereby and/or shrinking with the result that it is very difficult to achieve manufacturing tolerances as they are known from today's subtractive manufacturing techniques. Potential in-processing variations might add and make it even more difficult to produce a workpiece that conforms to a predefined design within small tolerances.

SUMMARY OF THE INVENTION

In view of the above, it is an object of the present invention to provide a method and an arrangement that facilitate a cost-efficient production of workpieces by using additive manufacturing techniques.

It is another object of the invention to provide a method and an arrangement that allow for an industrial production of workpieces using additive manufacturing techniques.

It is yet another object of the invention to improve additive manufacturing techniques, such that the workpieces produced meet high industry standards in terms of product quality and cost efficiency.

In order to achieve one or more of the aforementioned objects, there is provided a method of producing a workpiece by using additive manufacturing techniques, the method comprising the steps of providing a CAD data set representing the workpiece in a plurality of layers, said data set comprising a plurality of predefined layer definitions corresponding to the plurality of layers; providing a build platform; providing a layer tool moveable relative to the build platform and configured for at least one of generating and solidifying a material layer on said platform; providing a measuring head moveable relative to the build platform; producing a defined material layer of the workpiece on the build platform by controlling the layer tool in accordance with a defined layer definition from the plurality of layer definitions; measuring the defined material layer using the measuring head in order to determine individual characteristics of said defined material layer; and producing further material layers of the workpiece on the defined layer by controlling the layer tool in accordance with further layer definitions; wherein said further layer definitions are generated from the plurality of layer definitions as a function of the individual characteristics of said defined material layer.

There is also provided an arrangement for producing a workpiece by using additive manufacturing techniques, comprising a build platform, a layer tool moveable relative to the build platform and configured for at least one of generating and solidifying a plurality of material layers one on top of the other on said build platform, a measuring head, and a control unit comprising a memory for storing a CAD data set representing the workpiece in a plurality of layers and comprising a controller for driving the layer tool and the measuring head relative to the build platform, said control unit configured for determining a plurality of layer definitions corresponding to the plurality of layers, said control unit further configured for controlling the layer tool in accordance with a defined layer definition from the plurality of layer definitions in order to produce a defined material layer of the workpiece on the build platform, said control unit further configured for controlling the measuring head in order to determine individual characteristics of said defined material layer on the build platform, and said control unit further configured for modifying the predefined layer definitions in response to the individual characteristics of said defined material layer in order to produce further material layers of the workpiece on the defined layer as a function of the individual characteristics of said defined material layer.

There is also provided a method of producing a workpiece, wherein the workpiece is produced by generating and solidifying a plurality of material layers one on top of the other in accordance with a plurality of layer definitions from a CAD data set, wherein individual dimensional characteristics of the material layers are measured during the production process, and wherein at least some of the layer definitions are modified during the production process in response to the individual dimensional characteristics.

Accordingly, the new methods and arrangement involve an online adaptation of the predefined layer definitions during the production process and in response to measurement results derived from at least one material layer produced in the course of just the production process. The online adaptation makes it possible to optimize the layer structure in a self-correcting manner in the course of the production process. Measurement results taken from a material layer just produced might therefore influence production parameters of subsequent layers, which are applied on top of the material layer just produced. In some preferred embodiments, each material layer produced by the layer tool is measured before the next material layer is produced and the production parameters of such next material layer depend on the measurement results of one or more preceding material layers. In other preferred embodiments, only a selected number of material layers from the plurality of material layers are measured during the production process. The selection of material layers to be measured might depend on dimensional characteristics of the workpiece to be produced in some embodiments. For example, material layers might be selected for an in-process measurement, if the thickness of horizontal and/or vertical structures exceeds predefined thresholds. In these embodiments, measurements are taken whenever structures involving a large amount of material are built. In other embodiments, measurements might selectively be taken, when relatively thin or fragile structures are built.

The new methods and arrangement provide for an improved process control which advantageously allows for an increased accuracy and precision of all workpiece dimensions. For example, it is possible to correct for unexpected shrinkage and/or warping caused by thermal variations in the production process. Preferably, the measuring head is configured to provide 3D coordinates for selected measurement points on the material layer to be measured. Preferred measuring heads may comprise tactile probes, such as analog scanning probes or touch-trigger probes, optical image detectors exploiting triangulation and/or focusing methods, optical image detectors exploiting deflectometric image analysis, inductive or capacitive distance sensors, and/or tomographical metrology detectors. Appropriate measuring heads have been widely used in the field of post process quality inspection using conventional coordinate measuring machines and, accordingly, preferred embodiments of the invention involve the integration of coordinate measuring technology from coordinate measuring machines into additive manufacturing machines, or vice versa.

In addition to the increased accuracy and reproducibility, the new methods and arrangement provide measurement results that advantageously characterize structures that cannot easily be accessed after the production process is completed. In particular, various cross sections and internal dimensions of the workpiece can be determined from the measurement results in a manner that was not possible heretofore.

In a refinement of the invention, the step of producing a material layer comprises heating a process material up to a defined process temperature which is higher than an ambient temperature, and said step of measuring the defined material layer is carried out after heating the process material and before the defined material layer has cooled down to ambient temperature.

In this refinement, measurements are taken before the defined material layer has adopted its final characteristics. In some preferred embodiments, the defined material layer is repeatedly measured before the subsequent material layer is applied, such that changes of the defined material layer as a function of the decreasing temperature can be recorded and corrected for, if appropriate. Moreover, the measurement results may advantageously be evaluated in order to optimize the production process. Therefore, this refinement contributes to an even higher accuracy and reproducibility of workpieces produced by the additive manufacturing techniques.

In a further refinement, the step of producing a material layer comprises heating a process material up to a defined process temperature which is higher than an ambient temperature, and said step of measuring the defined material layer is carried out before the process material is heated up to the defined process temperature.

According to this refinement, a measurement step already takes place before the defined material layer is actually produced. This refinement is particularly advantageous, if the material layer is produced from a powder bed and the individual characteristics of the powder bed are measured before the powder material is selectively heated up to the defined process temperature. In some preferred embodiments, measurements are taken both prior to and after selectively heating the process material up to the defined process temperature. These refinements allow for a close in-process control of flatness and/or homogeneity of the powder bed. Any flaws in the creation of the powder bed, which might have a negative impact on the accuracy of the workpiece, can be immediately corrected for. The number of defective parts can thus be considerably decreased.

In a further refinement, the step of measuring the defined material layer is carried out while the defined material layer is supported on the platform.

This refinement provides a true in situ measurement of the workpiece layer without removing the workpiece from the build platform. This refinement is advantageous, because the measurement results are highly representative for the characteristics of the defined material layer prior to applying the subsequent layer. Therefore, this refinement exploits the advantages of the new integrated measurement and production system in a very beneficial manner.

In a further refinement, the step of measuring the defined material layer comprises determining at least one of geometrical and dimensional characteristics of the defined material layer. Preferably, at least one of thickness, flatness, roughness and compliance with predefined nominal lateral dimensions of the material layer are determined.

According to this refinement, geometrical and/or dimensional characteristics of the workpiece are directly monitored during the additive manufacturing process. Since geometrical and dimensional characteristics are very often critical for workpiece quality, it is highly advantageous to control these parameters online during the production process.

According to a further refinement, the step of measuring the defined material layer comprises determining at least one of a density and a temperature distribution of the defined material layer.

Temperature distribution and density of the material are parameters that might indirectly influence the accuracy of the workpiece after the production process is completed. Especially the temperature distribution in the defined material layer provides valuable information in order to control warping and/or internal stress, which might build up during the cooling process. A closed loop control of the temperature distribution and/or density is therefore beneficial in order to achieve a high product quality and reproducibility.

In a further refinement, the step of measuring is repeated for the further material layers in order to determine further individual characteristics, and the further individual characteristics are used in a closed loop configuration until a final material layer of the workpiece has been produced.

This refinement provides for a continuous in-process control of the production process not only for one material layer, but for the plurality of layers. In addition, this refinement automatically leads to a number of measurement results that allow to calculate various true cross sections. Accordingly, individual internal structures of the workpiece can be advantageously assessed.

In a further refinement, a production database is provided, which production database represents a nominal relationship between the predefined layer definitions, the layer tool and the material layers produced by the layer tool, wherein the production database is used in the step of controlling the layer tool in accordance with the defined layer definition, and wherein the production database is repeatedly updated in response to the individual characteristics.

This refinement establishes a self-learning database that is fed by the plurality of in-process measurement results. In turn, the database may advantageously be used for the control of the production process. The refinement allows for even higher product quality, because each production process provides updated feedback for the next production process. Systematic flaws in the production process can quickly be eliminated and individual machine characteristics can be accounted for.

In a further refinement, the workpiece is measured after removal from the build platform in order to determine final workpiece characteristics, wherein the production database is updated in response to the final workpiece characteristics.

This refinement includes the individual characteristics of the final workpiece in the feedback loop that advantageously enhances product quality. Interdependencies between process parameters and final product characteristics are exploited in some sort of continuing improvement process.

In a further refinement, the workpiece is finally measured after all layers of the plurality of layers are produced in order to verify conformance of the workpiece with the CAD data set.

According this refinement, an additional measurement is carried out after the production process is completed. In some embodiments, the additional measurement is carried out on a separate coordinate measuring machine, which means that a conventional quality inspection is carried out in addition to the new in-process quality control. In other embodiments, the additional measurement is carried out in situ, but after the workpiece has substantially or even completely cooled down to ambient temperature. Advantageously, the measurement results of this additional (final) measurement are also used for updating the production database mentioned above. This refinement makes clear, that the above-mentioned in-process measurements should not be confused with traditional after process quality control. Rather, it adds to such measurements in order to achieve an even higher accuracy.

In a further refinement, the step of producing further material layers comprises at least one of increasing an amount of process material relative to a nominal amount for filling voids in the defined material layer, decreasing an amount of process material relative to a nominal amount in order to correct for oversize dimensions of the defined material layer, modifying a movement parameter of the layer tool relative to the platform, and modifying a process temperature.

These refinements are directed to in-process reactions that exploit the measurement results in an advantageous manner. These refinements help to achieve a high product quality with a low rate of defective parts. Increasing or decreasing the amount of process material is an easy and efficient approach for in-process corrections in order to keep the workpiece within predefined specifications. Modifying movement parameters of the layer tool, such as movement trajectory, movement velocity or accelerations helps to optimize the production process for various parts having different characteristics. Modifying a process temperature likewise helps to optimize the production process. Advantageously, the modification of movement parameters or process temperatures is made using the production database mentioned above.

In a further refinement, the step of producing further material layers comprises a step of ablating excess material from the defined material layer using a subtractive manufacturing technique.

In this refinement, the additive manufacturing technique is complemented by an in-process abrasive correction, for example by grinding and/or milling, in order to correct for undesired excess material. This refinement also helps to keep the workpiece within predefined specifications.

In a further refinement, the step of producing further material layers is aborted if the individual characteristics of said defined material layer exceed a predefined threshold level.

According to this refinement, the production process is terminated if the in-process measurement results indicate that the desired product specifications cannot be achieved. In contrast to existing additive manufacturing methods and arrangements, time-consuming and expensive production of defective parts is avoided.

In a further refinement, the measuring head comprises at least one of a tactile probe, an optical metrology sensor and a computer tomography detector. In preferred embodiments, the optical metrology sensor comprises a camera and associated image processing equipment that allow for a 3D coordinate measurement.

This refinement advantageously uses well-established and proved measurement technologies for the in-process quality control in the production process. Accordingly, the measurement results can easily be evaluated and used in existing quality control systems.

In a further refinement, the build platform comprises a distinct datum feature defining a reference point for the measuring head.

This refinement integrates the production platform into the in-process measurement system and, therefore, facilitates advantageous 3D coordinate measurements in situ. A distinct datum feature makes it possible to measure dimensional and/or geometrical characteristics of the material layers and the workpiece with respect to a reference point that is linked to the production site of the workpiece. Therefore, the production process can be monitored even closer.

It goes without saying that the features mentioned above and yet to be explained below can be used not only in the respectively cited combination, but also in other combinations or on their own without departing from the scope of the present invention.

BRIEF DESCRIPTION OF THE DRAWING

Exemplary embodiments of the invention are illustrated in the drawing and will be explained in more detail in the description below. In the drawing.

DETAILED DESCRIPTION OF PREFERRED EMBODIMENTS

Figure 1:
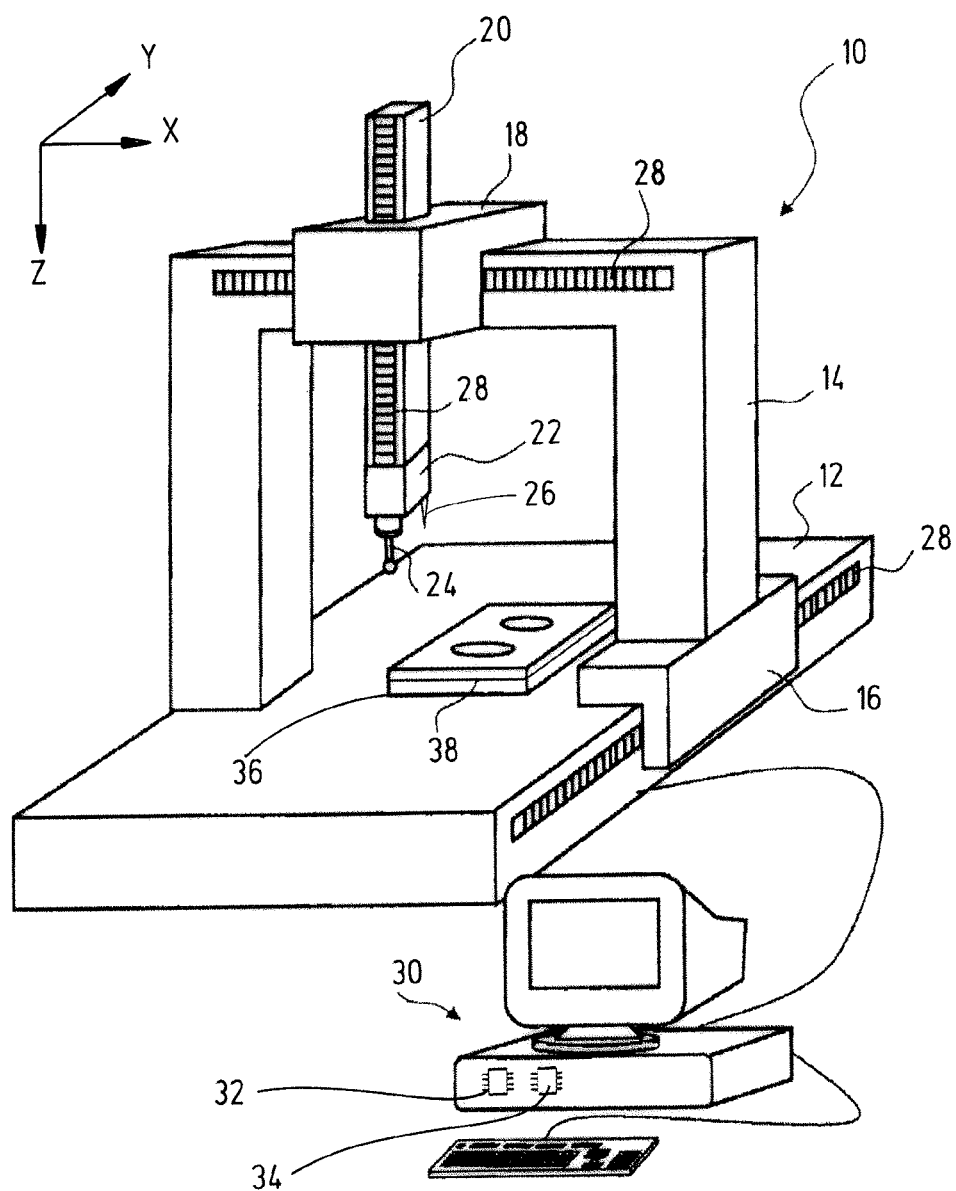
FIG. 1 shows an integrated workpiece production and measuring machine in accordance with an embodiment of the present invention.

In FIG. 1, an integrated production and measuring machine in accordance with an embodiment of the invention is designated by reference number 10 in its entirety. Machine 10 comprises a base 12, which is configured as a machine table in this embodiment. Table 12 may be used as a build platform in this embodiment. Other embodiments may involve build platforms that are separate from a machine base or table, such as tray-like platforms that can be handled by robots for feeding, conveying and unloading of workpieces in a multi-stage production arrangement.

In the present embodiment, a gantry 14 is moveably arranged on table 12. Gantry 14 comprises a foot 16 including an electrical drive for moving gantry 14 relative to table 12 in a linear direction, which is typically designated as Y-axis. Gantry 14 has a crossbar where a carriage 18 is moveably arranged. Carriage 18 can be moved relative to gantry 14 in a linear direction, which is typically designated as X-axis. One or more respective drives may be accommodated in carriage 18 or in the crossbar member of gantry 14 or in any other appropriate location.

Carriage 18 carries a quill 20 which is moveable in a third linear direction typically designated as Z-axis. Quill 20 carries a head 22, which may be a combined production and measuring head in accordance with some preferred embodiments. Head 22 here comprises a tactile measuring probe 24 and a layer tool 26 configured to produce material layers in order to produce a workpiece by additive manufacturing techniques. Layer tool 26 may be a powder jet combined with a heater for melting or sintering the powder material. The heater may comprise a laser. In other embodiments, layer tool 26 may comprise a laser for melting or sintering powder material arranged in a flat powder bed on platform 12. It should be appreciated that embodiments of the invention are not restricted to certain additive manufacturing techniques where a workpiece is built layer by layer. Therefore, FIG. 1 and the embodiments explained here are for illustrative purposes without a restriction to the details shown. Other embodiments may therefore comprise separate or additional tools, such as sliders for preparing a powder bed on platform 12. Moreover, measuring tool 24 may be a non-tactile probe and layer tool 26 may be separately arranged from measurement tool 24 in other embodiments of the invention.

In addition, it should be recognized that gantry-type machine 10 is also shown here by way of example. Other machine designs may also be appropriate.

In FIG. 1, reference number 28 designates various scales configured for determining a 3D position of head 22 within the working volume of the machine. Reference number 30 designates a control unit, which may be implemented using a programmable logic controller (PLC) and/or personal computer technology. By way of example, control unit 30 comprises a controller 32 configured for driving and operating layer tool 26 and measuring probe 24. In preferred embodiments, controller 32 might be implemented using a plurality of CPUs, and it may be configured for controlling layer tool 26 in a close-loop control using measurement data from probe 24. Reference number 34 designates a memory, such as a RAM, for storing CAD data representing the design of a workpiece to be built. Control unit 30 may comprise further memories (not shown), such as a non-volatile ROM, in order to store an operating system enabling control unit 30 to control layer tool 26 and probe 24 in accordance with CAD data from memory 34.

For illustrative purposes, a workpiece 36 is here arranged on platform 12. Workpiece 36 comprises a plurality of layers 38 which are formed one on top of the other (step-by-step) using layer tool 26 and using feedback representing individual characteristics of one or more of these layers from measurement probe 24.

Figure 2:
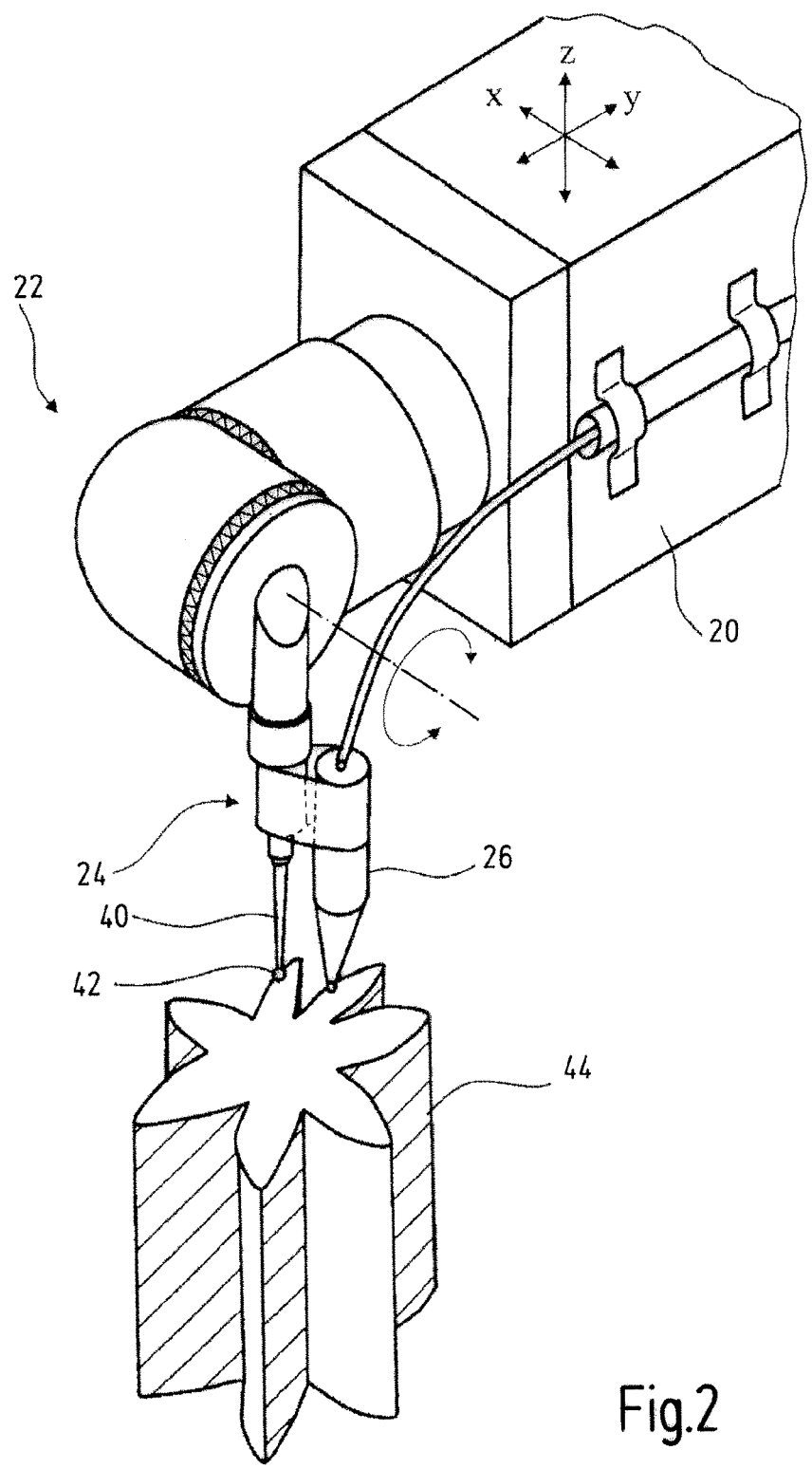
FIG. 2 shows a combined measurement and tool head for the machine of FIG. 1.

FIG. 2 illustrates some details of head 22. As can be seen, head 22 comprises a 2-axis rotary joint in this exemplary embodiment. The rotary joint allows to rotate measurement probe 24 and layer tool 26 about two mutually orthogonal axes. Such rotary joint allows various orientations of measurement probe 24 and layer tool 26 in accordance with advantageous embodiments. As already indicated above, however, other machine designs including those without a rotary joint may be suitable for implementing the present invention.

As can further be seen, measuring probe 24 here comprises a stylus 40 having a ball tip 42 for contacting selected measurement points on a recently applied workpiece layer 44. Control unit 30 may control probe 24 in a scanning motion and/or in a single point (touch-trigger) measuring mode.

Other embodiments may comprises other types of measurement probes including optical 2D or 3D camera sensors (e.g. using laser triangulation and/or focusing), capacitive sensors, optical camera sensors using deflectometry or scatterometry, electron or particle beam sensors, or tomographical metrology sensors in addition or as an alternative to tactile measuring probe 24. In preferred embodiments, probe 24 is capable of providing precise 3D measurement data representing dimensional and/or geometrical characteristics of a respective topmost workpiece layer (indicated here by reference numeral 44). Further advantageous measurement technologies comprise temperature sensors, pressure sensors, shear sensors and/or color sensors in order to determine corresponding characteristics of the workpiece and/or the respective topmost material layers. In some embodiments, a temperature distribution of the topmost material layers is determined in order to correct for warping which may result from residual stress in the workpiece after the production process.

In some preferred embodiments, a material layer of the workpiece is not only measured after the material layer has been produced. Rather, it might be advantageous especially for powder bed machines to measure individual characteristics of the powder material before the powder material is melted or sintered using a laser, for instance. Optical metrology sensors are very suitable for these kinds of in-process measurements. In some embodiments, the measurement sensor may be attached to a slider configured for producing the powder bed prior to the melting or sintering step.

Figure 3:
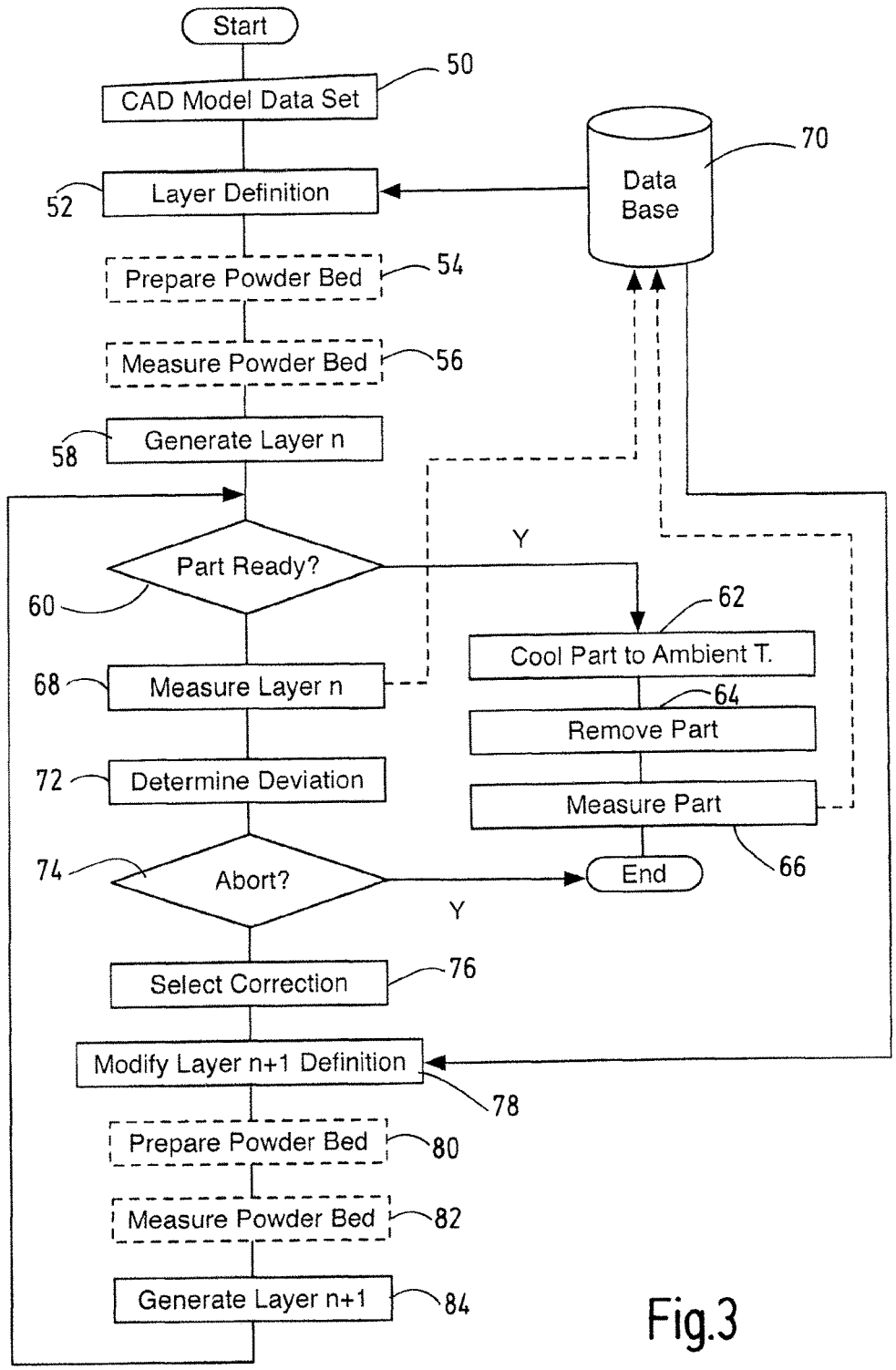
FIG. 3 shows a flow diagram illustrating preferred operating modes of the machine of FIG. 1.

FIG. 3 shows a flow chart in order to illustrate an exemplary embodiment of the new method and a corresponding operating mode of machine 10. According to step 50, a CAD model dataset comprising CAD data of the desired workpiece is provided. The CAD dataset may be generated using conventional design tools. In preferred embodiments, the CAD data set is loaded into memory 34 of control unit 30, which subsequently controls machine operations in accordance with the CAD model dataset.

According to step 52, layer definitions for each workpiece layer are determined. This step might be carried out on or using control unit 30. In other embodiments, layer definitions may be determined separate from control unit 30 and loaded into an appropriate memory of control unit 30.

In some preferred embodiments, the method uses powder bed technology, where a flat bed of powder material is produced. A laser or some other suitable heater may then melt or sinter selected areas within the powder bed in order to produce a desired layer structure. Powder material that is not melted or sintered may be removed afterwards and prior to the next production step. Accordingly, some embodiments of the new method involve step 54, where a powder bed is prepared. Optional step 56 may comprise the measurement of individual characteristics of the powder bed prior to generating the desired material layer by a melting or sintering step 58.

According to step 60, a determination is made whether or not the desired workpiece is completed. If in the affirmative, the workpiece may be cooled down to ambient temperature in accordance with step 62. The workpiece may be removed from platform 12 in accordance with step 64. The workpiece may then be measured using conventional coordinate measuring technology in accordance with step 66. It should be noted that the measurement according to step 66 typically takes place after the production process has been completed. In some preferred embodiments, measurement step 66 is carried out on a separate measuring machine, although it would also be feasible to use the combined measurement and production machine 10.

If it is determined in step 60 that the workpiece production process is completed, recently produced workpiece layer n is measured in accordance with step 68. The measurement results may be used to update a production database 70. Advantageously, production database 70 is used for determining the layer definitions in accordance with step 52. In particular, measurement results from step 68 may be used in order to optimize layer definitions already at the beginning of the production process, because the measurement results from step 68 provide a valuable feedback about the layer generation step 58.

According to step 72, any deviations between the desired layer characteristics represented by the layer definitions and the real layer characteristics represented by the measurement results from step 68 are determined. In some preferred embodiments, the production process is aborted according to step 74, if it is determined that the measured layer characteristics deviate from the desired definitions to such an extent that no correction in the further course of the production process seems possible. If, however, a correction of detected deviations seems possible, an appropriate correction may be selected in accordance with step 76. Appropriate correction may comprise at least one of increasing an amount of process material for the subsequent layer at selective locations thereby increasing the thickness of the subsequent layer at the selective locations. If appropriate, the amount of process material for the subsequent layer may locally or generally be decreased in order to correct for oversize dimensions of the layer measured in step 68. It is also feasible that the "subsequent layer" is a pure correction layer for correction of the measured layer, i.e. the defective layer is processed again. Movement parameters of the layer tool including velocity and/or trajectory may be modified and/or process temperatures for the subsequent layer generation may be changed in accordance with the results from the measurement step 68.

Therefore, step 78 generally involves modification of subsequent layer definitions. Again, knowledge from database 70 might advantageously be used. In preferred embodiments, the modification of layer definitions including modification of movement parameters, process temperatures etc. may only be used at selected locations of the subsequent workpiece layer, if appropriate.

Subsequent steps 80, 82, 84 correspond to steps 54, 56, 58 already explained above. Accordingly, a next workpiece layer n+1 is generated and the method loops back to step 60 in order to determine if all predefined workpiece layers have been produced.

As can be seen from FIG. 3, preferred embodiments of the invention comprise a real-time in-process measurement of individual characteristics of recently generated workpiece layers as well as an in-process feedback of the measurement results into the production process for the build of subsequent workpiece layers or portions of workpiece layers. Advantageously, a self-learning database is fed with the in-process measurement results in order to optimize the production process on a long term basis. Additional after-process measurement may also be used to feed and update a production database.

What is claimed is:

1. A method of producing a workpiece by using additive manufacturing techniques, the method comprising the steps of:

providing a CAD data set representing the workpiece in a plurality of layers, the CAD data set comprising a plurality of predefined layer definitions corresponding to the plurality of layers, providing a build platform, providing a layer tool moveable relative to the build platform and configured for at least one of generating and solidifying a material layer on the build platform, producing a defined material layer of the workpiece on the build platform by controlling the layer tool in accordance with a defined layer definition from the plurality of layer definitions, measuring the defined material layer of the workpiece using a measuring head in order to determine individual characteristics of the defined material layer during the production process, and producing further material layers of the workpiece on the defined layer by controlling the layer tool in accordance with further layer definitions, wherein the further layer definitions are generated by modifying at least one of the plurality of predefined layer definitions corresponding to the further material layers during the production process using information from the determined individual characteristics of the defined material layer, wherein the step of producing a material layer comprises heating a process material provided in a powder bed up to a defined process temperature that is higher than an ambient temperature, and wherein the step of measuring is carried out on the basis of the powder bed before the process material is heated up to the defined process temperature.

2. The method of claim 1, wherein the step of measuring the defined material layer is carried out while the defined material layer is supported on the build platform.

3. The method of claim 1, wherein the step of measuring the defined material layer comprises determining at least one of geometrical and dimensional characteristics of the defined material layer.

4. The method of claim 1, wherein the step of measuring the defined material layer comprises determining at least one of a density and a temperature distribution of the defined material layer.

5. The method of claim 1, wherein the step of measuring is repeated for the further material layers in order to determine further individual characteristics, and wherein the further individual characteristics are used in a closed loop configuration until a final material layer of the workpiece has been produced.

6. The method of claim 1, further comprising a step of providing a production database containing data that is used to determine the plurality of predefined layer definitions and the relationship between the plurality of predefined layer definitions and the layer tool, wherein the production database is used in the step of controlling the layer tool in accordance with the defined layer definition, and including the further step of updating the data in the production database in accordance with the determined individual characteristics of the defined material layer.

7. The method of claim 6, further comprising a step of measuring the workpiece after removal from the build platform in order to determine final workpiece characteristics, wherein the data in the production database is updated in accordance with the final workpiece characteristics.

8. The method of claim 1, wherein the workpiece is finally measured after all layers of the plurality of layers are produced in order to verify conformance of the workpiece with the CAD data set within predefined tolerances.

9. The method of claim 1, wherein the step of measuring the defined material layer of the workpiece comprises determining 3D coordinates for selected measurement points on the defined material layer using the measuring head.

10. The method of claim 9, wherein the step of producing further material layers comprises a step of ablating excess material at a particular location from the defined material layer using a subtractive manufacturing technique.

11. The method of claim 1, wherein the step of producing further material layers is aborted if the individual characteristics of the defined material layer exceed a predefined threshold level.

12. The method of claim 1, wherein the measuring head comprises at least one of a tactile probe, an optical metrology sensor and a computer tomography detector.

13. The method of claim 9, wherein the step of producing further material layers comprises at least one of increasing an amount of process material relative to a nominal amount for filling voids at a particular location in the defined material layer, decreasing an amount of process material relative to a nominal amount in order to correct for an oversize dimension at a particular location in the defined material layer, modifying a movement parameter of the layer tool relative to the build platform, and modifying a process temperature.

14. A method of producing a workpiece by using additive manufacturing techniques, the method comprising the steps of:
providing a CAD data set representing the workpiece in a plurality of layers, the CAD data set comprising a plurality of predefined layer definitions corresponding to the plurality of layers,
providing a build platform,
providing a layer tool moveable relative to the build platform and configured for at least one of generating and solidifying a material layer on the build platform,
providing a measuring head moveable relative to the build platform,
producing a defined material layer of the workpiece on the build platform by controlling the layer tool in accordance with a defined layer definition from the plurality of layer definitions,
measuring the defined material layer of the workpiece using the measuring head in order to determine individual characteristics of the defined material layer, and
producing further material layers of the workpiece on the defined layer by controlling the layer tool in accordance with further layer definitions,
wherein the further layer definitions are generated from the plurality of layer definitions in accordance with the determined individual characteristics of the defined material layer,
wherein the step of producing a material layer comprises heating a process material provided in a powder bed up to a defined process temperature that is higher than an ambient temperature, and
wherein the step of measuring is carried out on the basis of the powder bed before the process material is heated up to the defined process temperature.

15. The method of claim 14, wherein the step of measuring the defined material layer of the workpiece comprises determining 3D coordinates for selected measurement points on the defined material layer using the measuring head.

16. The method of claim 15, wherein the step of producing further material layers comprises at least one of increasing an amount of process material relative to a nominal amount for filling voids at a particular location in the defined material layer, decreasing an amount of process material relative to a nominal amount in order to correct for an oversize dimension at a particular location in the defined material layer, modifying a movement parameter of the layer tool relative to the build platform, and modifying a process temperature.

17. A method of producing a workpiece by using additive manufacturing techniques, the method comprising the steps of:
providing a CAD data set representing the workpiece in a plurality of layers, the CAD data set comprising a plurality of predefined layer definitions corresponding to the plurality of layers,
providing a build platform,
providing a layer tool moveable relative to the build platform and configured for at least one of generating and solidifying a material layer on the build platform,
producing a defined material layer of the workpiece on the build platform by controlling the layer tool in accordance with a defined layer definition from the plurality of layer definitions,
measuring the defined material layer of the workpiece using a measuring head in order to determine individual characteristics of the defined material layer during the production process, and
producing further material layers of the workpiece on the defined layer by controlling the layer tool in accordance with further layer definitions,
wherein the further layer definitions are generated by modifying at least one of the plurality of predefined layer definitions corresponding to the further material layers during the production process using information from the determined individual characteristics of the defined material layer, and
wherein the build platform comprises a distinct datum feature defining a reference point for the measuring head.

18. The method of claim 9, wherein the step of producing further material layers comprises at least one of increasing an amount of process material relative to a nominal amount for filling voids at a particular location in the defined material layer and decreasing an amount of process material relative to a nominal amount in order to correct for an oversize dimension at a particular location in the defined material layer.

19. The method of claim 18, wherein the step of producing further material layers comprises a step of ablating excess material at a particular location from the defined material layer using a subtractive manufacturing technique.

\* \* \* \* \*